Patented July 12, 1932

1,867,085

UNITED STATES PATENT OFFICE

OTTO S. MARCKWORTH, OF COLUMBUS, OHIO

METHOD OF MANUFACTURING NONSCATTERABLE GLASS

No Drawing. Application filed March 7, 1924. Serial No. 697,677.

This invention is a method of controlling the activity of solvents, such as are normally utilized to produce the bond between the laminæ which form the product known as non-scatterable glass.

One of the objects of the invention is to avoid the necessity of high temperatures and heavy pressures in the manufacture of nonscatterable glass, thereby preventing introduction of strains in the glass. A further object is to prevent any tendency to cause incipient decomposition of the binder, especially referring to binders of the nitro-cellulose variety. A further object is to prevent losses of bonding liquid due to volatilization, thereby not only lessening the expense of manufacture, but also keeping the air in the factory free from "fumes". A further object is to materially lower the amount of breakage of ware in process of manufacture. A further object is to simplify the operations of sandwiching, by producing a permanent adhesion at low temperatures and pressures. A further object is to largely extend the list of possible solvents which may be successfully used, thus making it possible to take advantage of market fluctuations.

In the production of non-scatterable glass temperature and pressure are fundamental factors. It has been the general practice, to utilize both of these factors to their maximum extent, in order that the greatest possible bonding effect may be produced thereby. Such practice, however, endangers the life of both the glass and binder components, and especially of the usual nitro-cellulose binder. Such practice for example, leads to the development of strains in the glass, and incipient decomposition of a latent nature in the binder. Generally these defects are not immediately apparent, but their presence is subsequently indicated by the unexpected development of cracks in the glass, and discoloration in the binder, which appear soon after manufacture.

Experiment has demonstrated that the action of all solvents, whether of the "active" or "latent" variety, may be perfectly controlled at will, by working them at temperatures and variations diminished in approximate proportion to their activity upon the particular binding material which it is intended to use. It has also been found that the effects upon different lots of the same manufacturer's material (which frequently show considerable variations), may be most conveniently and accurately controlled by means of variation of temperature, when the methods used are such as employ solvents of any character, rather than to vary the composition or character of the solvent.

In practicing the invention, heat, as a factor in the deterioration of the finished nonscatterable glass, is entirely eliminated. Even the use of the most active solvents is made possible with perfect ease and accuracy. To take an extreme example, when sheet celluloid is dipped at ordinary room temperatures into a 45-55 solution of amyl acetate and acetone, the sheet instantly becomes swollen, slimy and flabby, and utterly useless. However, by depressing the temperature to approximately $-18°$ C., a "sandwich" of glass and the celluloid so dipped, may be made up very easily. This may then be transferred to a "cold" (room temperature) press, and a perfectly sound sheet of non-scatterable glass may be produced without any applied heat, and with a pressure only sufficient to squeeze out excess of solvent and entrained air bubbles. With fairly flat glass ten pounds per square inch is sufficient pressure. In other words, elements of heating costs and principal causes of subsequent deterioration, such as heat and pressure, have been at once practically eliminated.

In practice, however, much less active solvents are preferably used. For instance, it has been fully demonstrated that such solvents or other mixtures as will form a permanent bond at temperatures ranging up to 75° C., and pressures of less than forty pounds per square inch, have very little effect upon the product as related to cracking strains and incipient decomposition.

The invention, therefore, contemplates the use of any active or retarded single solvent, or solvent mixtures at subnormal temperatures as compared with average factory temperatures. Such working temperatures will preferably be produced by chilled water, brine or other suitable media, circulating about or through the bonding liquid. After dipping the binding element, the "sandwich" is assembled in any preferred manner and pressure applied. Depending upon the bonding liquid used, the press may either be chilled, worked at room temperatures, or be moderately heated. The usual methods of dipping both the glass and the binder, or only the binder into the bonding liquid, may be practiced to effect the "sandwiching" operation.

The advantages of the invention are many. For instance the necessity of high temperatures and heavy pressures is avoided, thereby preventing the introduction of strains in the glass, and material lowering the amount of breakage of the ware in process of manufacture. The tendency to cause incipient decomposition of the binder is prevented, thereby producing a product of a superior lustre and a more permanent product from the standpoint of fading and separating. By preventing losses of the bonding liquid due to volatilization, the expense of manufacture is materially lessened, and the air in the factory is kept free from fumes. An important advantage is that the operation of "sandwiching" is simplified, and a permanent adhesion is produced at low temperatures and pressures. In addition to this, the list of possible solvents which my be successfully used is largely extended, thus making it possible to take advantage of market fluctuations.

Having thus explained the nature of the invention and described an operative manner of constructing and using the same, although without attempting to set forth all of the forms in which it may be made, or all of the forms of its use, what is claimed is:—

1. A method of manufacturing non-scatterable glass comprising applying a solvent which is free of extraneous retarding agents, to a binder element and then assembling the constituent laminæ to provide a blank, said steps being performed while the solvent and constituent laminæ are maintained at a temperature below that at which the solvent is normally active and substantially below room temperature, and then subjecting the assembled blank to pressure at approximately room temperature.

2. A method of manufacturing non-scatterable glass comprising dipping a binder element into a solvent which is free of extraneous retarding agents, and then assembling the constituent laminæ to provide a blank, said steps being performed while the solvent and the laminæ are maintained at a temperature below that at which the solvent is normally active and substantially below room temperature, and then completing the sandwich by subjecting the blank to cold press pressure.

3. A method of manufacturing non-scatterable glass comprising applying a solvent which is free of extraneous retarding agents, to a binder element and then assembling the constituent laminæ to provide a blank, said steps being performed while the solvent and the constituent laminæ are maintained at a temperature below that at which the solvent is normally active, and then subjecting the blank to cold press pressure until the laminæ are united, the pressure applied being sufficient only to squeeze out the excess solvent and entrained air bubbles.

4. A method of manufacturing non-scatterable glass comprising applying a solvent which is free of extraneous retarding agents, to a binder element and then assembling the constituent laminæ to provide a blank, said steps being performed while the solvent and the constituent laminæ are maintained at a temperature below that at which the solvent is normally active, and then subjecting the blank to cold press pressure of approximately ten pounds per square inch.

5. A method of manufacturing non-scatterable glass comprising applying a solvent which is free of extraneous retarding agents, to a binder element and then assembling the constituent laminæ to provide a blank, said steps being performed while the solvent and constituent laminæ are maintained at a temperature approximating $-18°$ C. so as to maintain the solvent in a dormant condition, and finally withdrawing the blank from the sub-normal temperature and subjecting it to cold press pressure.

6. The method of manufacturing non-scatterable glass comprising dipping a binder element into a solvent which is free of extraneous retarding agents, and then assembling the constituent laminæ to provide a blank, said steps being performed while the solvent and constituent laminæ are maintained at a temperature approximating $-18°$ C., so as to maintain the solvent in a dormant condition, and then subjecting the blank to pressure at room temperature, the pressure applied being sufficient only to squeeze out the excess solvent and entrained air bubbles.

7. The method of manufacturing non-scatterable glass comprising applying a solvent which is free of extraneous retarding agents, to a binder element, and then assembling the constituent laminæ to provide a blank, said steps being performed while the solvent and the laminæ are maintained at a temperature below approximately zero centigrade so as to maintain the solvent in a dormant condition, and finally subjecting the blank to cold press pressure of approximately ten pounds per square inch.

8. The method of manufacturing non-scatterable glass comprising dipping a binder element into a solvent which is free of extraneous retarding agents, and assembling the constituent laminæ to provide a blank, said steps being performed while the solvent and the laminæ are maintained at a temperature of approximately $-18°$ C. so as to maintain the solvent in a dormant condition, and finally subjecting the blank to cold press pressure of approximately ten pounds per square inch.

In testimony whereof I have hereunto set my hand.

OTTO S. MARCKWORTH.